(12) United States Patent
John Wilson et al.

(10) Patent No.: US 11,265,949 B2
(45) Date of Patent: Mar. 1, 2022

(54) FAST SECONDARY CELL RECOVERY FOR ULTRA-RELIABLE LOW-LATENCY COMMUNICATION

(71) Applicant: QUALCOMM Incorporated, San Diego, CA (US)

(72) Inventors: Makesh Pravin John Wilson, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/570,605

(22) Filed: Sep. 13, 2019

(65) Prior Publication Data

US 2020/0113010 A1 Apr. 9, 2020

Related U.S. Application Data

(60) Provisional application No. 62/742,880, filed on Oct. 8, 2018.

(51) Int. Cl.
*H04W 76/19* (2018.01)
*H04W 72/14* (2009.01)
*H04W 72/04* (2009.01)

(52) U.S. Cl.
CPC ......... *H04W 76/19* (2018.02); *H04W 72/046* (2013.01); *H04W 72/0413* (2013.01); *H04W 72/14* (2013.01)

(58) Field of Classification Search
CPC .......... H04W 72/0413; H04W 72/046; H04W 72/14; H04W 76/19; H04B 7/022; H04B 7/0695; H04B 7/088
See application file for complete search history.

(56) References Cited

U.S. PATENT DOCUMENTS

| | | | |
|---|---|---|---|
| 2018/0219604 A1* | 8/2018 | Lu | H04L 1/12 |
| 2018/0278467 A1* | 9/2018 | John Wilson | H04W 72/046 |
| 2018/0302889 A1* | 10/2018 | Guo | H04B 7/0617 |
| 2018/0323856 A1* | 11/2018 | Xiong | H04B 7/088 |
| 2018/0368126 A1* | 12/2018 | Islam | H04L 1/00 |

(Continued)

OTHER PUBLICATIONS

Huawei, HiSilicon, "Link recovery procedure for beam failure", 3GPP TSG RAN WG1 Meeting #88b Spokane, USA, Apr. 3-7, 2017; R1-1704230 (Year: 2017).*

(Continued)

*Primary Examiner* — Gary Mui
(74) *Attorney, Agent, or Firm* — Harrity & Harrity, LLP

(57) ABSTRACT

Various aspects of the present disclosure generally relate to wireless communication. In some aspects, a user equipment may provide, to a first cell, a beam failure indication associated with a beam of a secondary cell. The beam failure indication may be provided via a dedicated physical uplink control channel (PUCCH) resource. The user equipment may provide, based at least in part on providing the beam failure indication, a beam index report to a second cell. The beam index report may be provided to cause recovery of the secondary cell to be triggered. The beam index report may include information that identifies a preferred beam associated with the recovery of the secondary cell. Numerous other aspects are provided.

30 Claims, 13 Drawing Sheets

(56) References Cited

U.S. PATENT DOCUMENTS

| | | | |
|---|---|---|---|
| 2019/0074891 A1* | 3/2019 | Kwon | H04W 56/003 |
| 2019/0075573 A1* | 3/2019 | Kwon | H04W 72/0413 |
| 2019/0081687 A1* | 3/2019 | Sadiq | H04W 74/0833 |
| 2019/0150010 A1* | 5/2019 | Kwon | H04W 24/10 370/252 |
| 2019/0200248 A1* | 6/2019 | Basu Mallick | H04B 7/0695 |
| 2019/0207667 A1* | 7/2019 | Zhou | H04L 1/0009 |
| 2019/0230529 A1* | 7/2019 | Sadiq | H04W 24/04 |
| 2019/0274098 A1* | 9/2019 | Cheng | H04L 5/0091 |
| 2019/0280756 A1* | 9/2019 | Fan | H04B 7/0695 |
| 2019/0306765 A1* | 10/2019 | Cirik | H04L 5/0051 |
| 2019/0327769 A1* | 10/2019 | Yang | H04W 24/08 |
| 2020/0029383 A1* | 1/2020 | Venugopal | H04L 5/001 |
| 2020/0052769 A1* | 2/2020 | Cirik | H04W 80/02 |
| 2020/0059398 A1* | 2/2020 | Pan | H04W 72/0413 |
| 2020/0092777 A1* | 3/2020 | Agiwal | H04W 24/08 |
| 2020/0178338 A1* | 6/2020 | Ahn | H04B 7/0626 |
| 2020/0404693 A1* | 12/2020 | Zhou | H04W 72/14 |
| 2021/0144703 A1* | 5/2021 | Jung | H04W 72/0413 |

OTHER PUBLICATIONS

Intel Corporation; "Discussion for Mechanism to Recover from Beam Failure"; 3GPP TSG-RAN WG1 #89 Hangzhou, China, May 15-19, 2017; R1-1707356 (Year: 2017).*

NEC; "Low latency beam failure recovery by PRACH/PRACH-like"; 3GPP TSG RAN WG1 Meeting #89 Hangzhou, P.R. China May 15-19, 2017; R1-1707814 (Year: 2017).*

Institute for Information Industry (III); "Discussion on beam failure recovery mechanism"; 3GPP TSG-RAN WG1 Meeting #89 Hangzhou, China May 15-19, 2017; R1-1708874 (Year: 2017).*

Qualcomm; "Beam failure recovery procedure"; 3GPP TSG-RAN WG1 #92b Sanya, China, Apr. 16-Apr. 20, 2018; R1-1804788 (Year: 2018).*

Huawei, HiSilicon; "Remaining issue for beam failure recovery"; 3GPP TSG-RAN WG2 Ad Hoc Vancouver, Canada, Jan. 22-Jan. 16, 2018; R2-1800632 (Year: 2018).*

Samsung; "MAC Impacts: Beam Failure Recovery for SCell"; 3GPP TSG-RAN2 101bis Sanya, China, Apr. 16-Apr. 20, 2018; R2-1804303 (Year: 2018).*

AT&T: "Enhancements on Multi-Beam Operation for NR", 3GPP Draft; R1-1810688 Enhancements On Multi-Beam Operation, 3rd Generation Partnership Project (3GPP), Mobile Competence Centre ; 650, Route Des Lucioles ; F-06921 Sophia-Antipolis Cedex; France, vol. RAN WG1, No. Chengdu, China; Oct. 8, 2018-Oct. 12, 2018, Sep. 29, 2018 (Sep. 29, 2018), XP051518092, 5 Pages, Retrieved from the Internet: URL:http://www.3gpp.org/ftp/tsg%5Fran/WG1%5FRL1/TSGR1%5F94b/Docs/R1%2D1810688%2Ezip [retrieved on Sep. 29, 2018] p. 4.

InterDigital Inc: "BFR on SCell", 3GPP Draft; R2-1806821 (R15 NR WI AI103142 BFR on Scell), 3rd Generation Partnership Project (3GPP), Mobile Competence Centre; 650, Route Des Lucioles ; F-06921 Sophia-Antipolis Cedex ; France, vol. RAN WG2. No. Busan, Republic of Korea; May 21, 2018-May 25, 2018, May 20, 2018 (May 20, 2018), XP051443272, 2 Pages, Retrieved from the Internet: URL:http://www.3gpp.org/ftp/Meetings%5F3GPP%5FSYNC/RAN2/Docs/ [retrieved on May 20, 2018] p. 2, paragraph-paragraph.

International Search Report and Written Opinion—PCT/US2019/051293—ISA/EPO—dated Nov. 21, 2019.

Nokia et al., "SCell Beam Failure Recovery", 3GPP Draft; R2-1805342 Scell Beam Failure Recovery, 3rd Generation Partnership Project (3GPP), Mobile Competence Centre; 650, Route Des Lucioles ; F-06921 Sophia-Antipolis Cedex ; France, vol. RAN WG2, No. Sanya, China; Apr. 16, 2018-Apr. 20, 2018, Apr. 6, 2018 (Apr. 6, 2018), XP051415970, 3 Pages, Retrieved from the Internet: URL:http://www.3gpp.org/ftp/tsg%5Fran/WG2%5FRL2/TSGR2%5F101bis/Docs/ [retrieved on Apr. 6, 2018] p. 1, paragraph 2.1-p. 2, paragraph 2.3.

Qualcomm Incorporated: "Enhancements on Multi-beam Operation", 3GPP Draft; R1-1811278 Enhancements On Multi-Beam Operation, 3rd Generation Partnership Project (3GPP), Mobile Competence Centre, 650, Route Des Lucioles, F-06921, Sophia-Antipolis Cedex, France, vol. RAN WG1, No. Chendu, China; Oct. 8, 2018-Oct. 12, 2018, Sep. 29, 2018 (Sep. 29, 2018, XP051518681, 12 Pages, Retrieved from the Internet: URL: http://www.3gpp.org/ftp/tsg%5Fran/WG1%5FRL1/TSGR1%5F94b/Docs/R1%2D1811278%2Ezip [retrieved on Sep. 29, 2018] p. 1-p. 3, figures 1-3.

VIVO: "Discussion on Scell BFR", 3GPP Draft; R1-1810409 Discussion On Scell BFR, 3rd Generation Partnership Project (3GPP), Mobile Competence Centre; 650, Route Des Lucioles ; F-06921 Sophia-Antipolis Cedex ; France, vol. RAN WG1, No. Chengdu, China; Oct. 8, 2018-Oct. 12, 2018, Sep. 29, 2018 (Sep. 29, 2018), XP051517818, 4 Pages, Retrieved from the Internet: URL:http://www.3gpp.org/ftp/tsg%5Fran/WG1%5FRL1%5F94b/Docs/R1%2D1810409%2Ezip [retrieved on Sep. 29, 2018] p. 1.

* cited by examiner

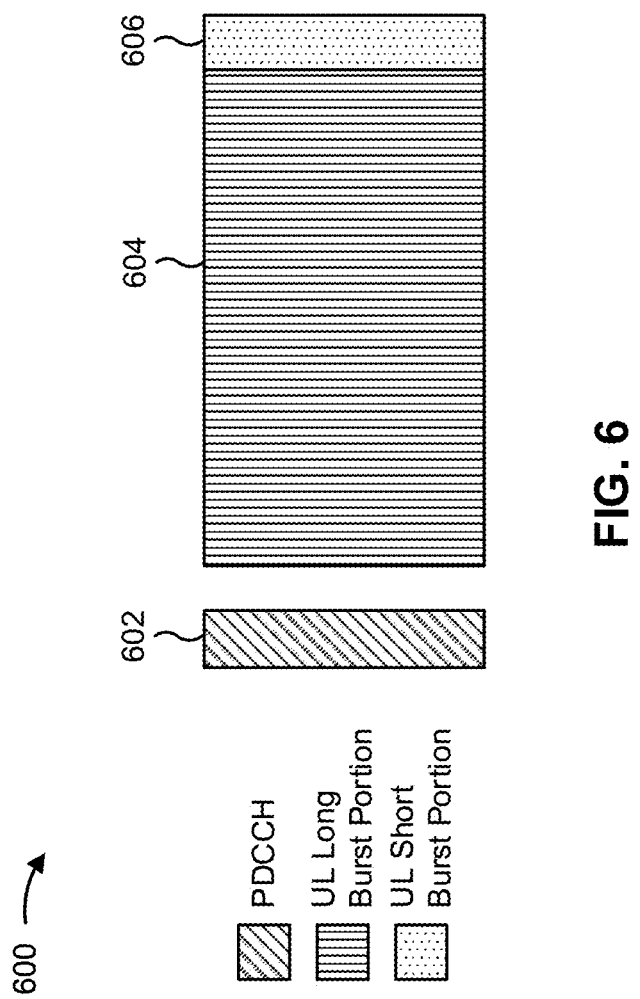

FAST SECONDARY CELL RECOVERY FOR ULTRA-RELIABLE LOW-LATENCY COMMUNICATION

CROSS REFERENCE TO RELATED APPLICATION

This application claims priority to U.S. Provisional Application No. 62/742,880, filed on Oct. 8, 2018, entitled "FAST SECONDARY CELL RECOVERY FOR ULTRA-RELIABLE LOW-LATENCY COMMUNICATION," which is hereby expressly incorporated by reference herein.

FIELD OF THE DISCLOSURE

Aspects of the present disclosure generally relate to wireless communication, and to techniques and apparatuses for fast secondary cell recovery for ultra-reliable low-latency communication (URLLC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include providing, to a first cell, a beam failure indication associated with a beam of a secondary cell, wherein the beam failure indication is provided via a dedicated physical uplink control channel (PUCCH) resource; and providing, based at least in part on providing the beam failure indication, a beam index report to a second cell, wherein the beam index report is to cause recovery of the secondary cell to be triggered, and wherein the beam index report includes information that identifies a preferred beam associated with the recovery of the secondary cell.

In some aspects, a user equipment for wireless communication may include memory and one or more processors operatively coupled to the memory. The memory and the one or more processors may be configured to provide, to a first cell, a beam failure indication associated with a beam of a secondary cell, wherein the beam failure indication is provided via a dedicated PUCCH resource; and provide, based at least in part on providing the beam failure indication, a beam index report to a second cell, wherein the beam index report is to cause recovery of the secondary cell to be triggered, and wherein the beam index report includes information that identifies a preferred beam associated with the recovery of the secondary cell.

In some aspects, a non-transitory computer-readable medium may store one or more instructions for wireless communication. The one or more instructions, when executed by one or more processors of a user equipment, may cause the one or more processors to provide, to a first cell, a beam failure indication associated with a beam of a secondary cell, wherein the beam failure indication is provided via a dedicated PUCCH resource; and provide, based at least in part on providing the beam failure indication, a beam index report to a second cell, wherein the beam index report is to cause recovery of the secondary cell to be triggered, and wherein the beam index report includes information that identifies a preferred beam associated with the recovery of the secondary cell.

In some aspects, an apparatus for wireless communication may include means for providing, to a first cell, a beam failure indication associated with a beam of a secondary cell, wherein the beam failure indication is provided via a dedicated PUCCH resource; and means for providing, based at least in part on providing the beam failure indication, a beam index report to a second cell, wherein the beam index report is to cause recovery of the secondary cell to be triggered, and wherein the beam index report includes information that identifies a preferred beam associated with the recovery of the secondary cell.

In some aspects, the aspects described herein may apply to non-URLLC traffic (e.g., regular traffic). In other words, the aspects described herein are not limited to fast recovery of a secondary cell associated with URLLC traffic, and may be applied in association with fast recovery of a secondary cell for another type of traffic.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of an uplink (UL)-centric slot, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
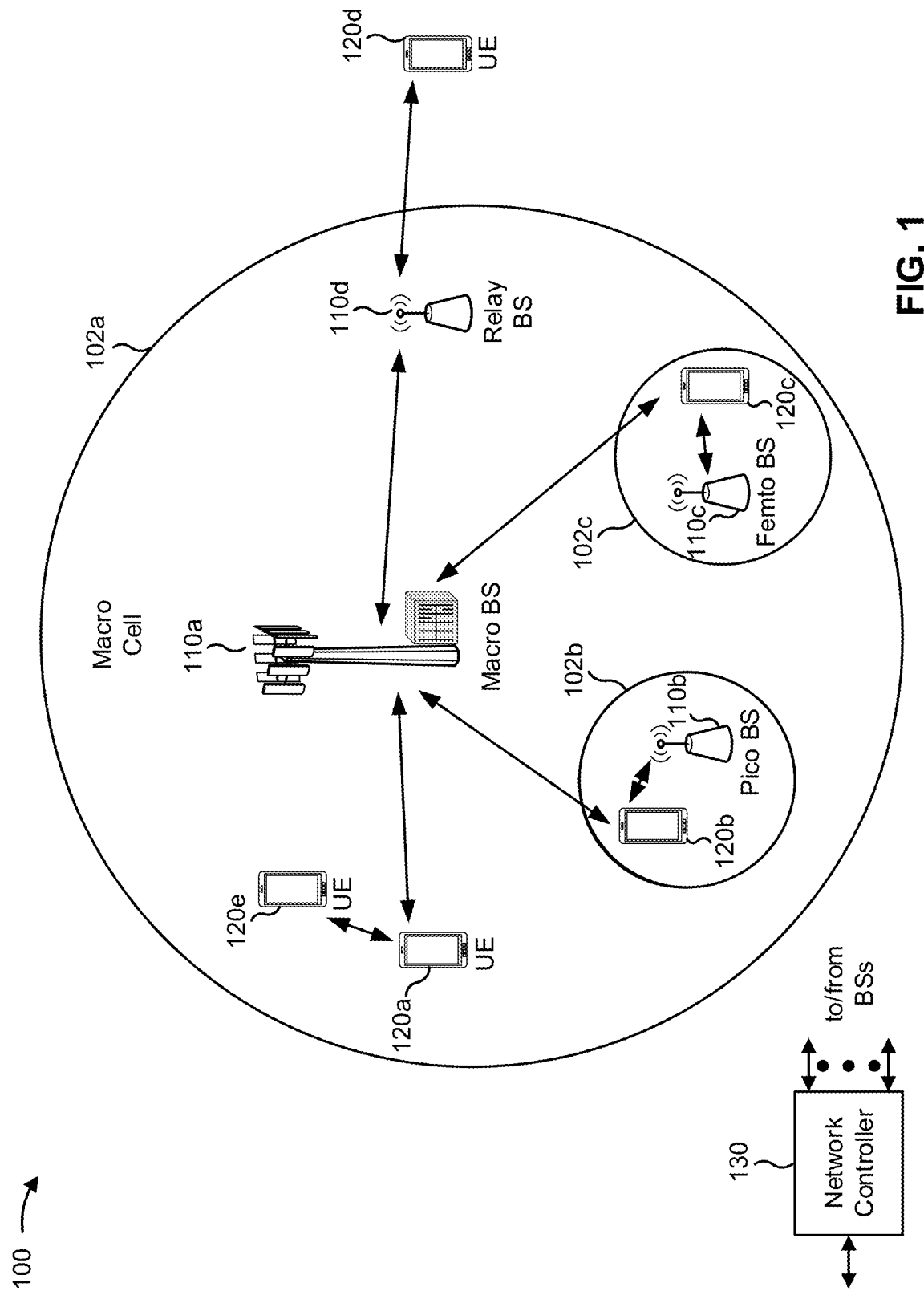
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
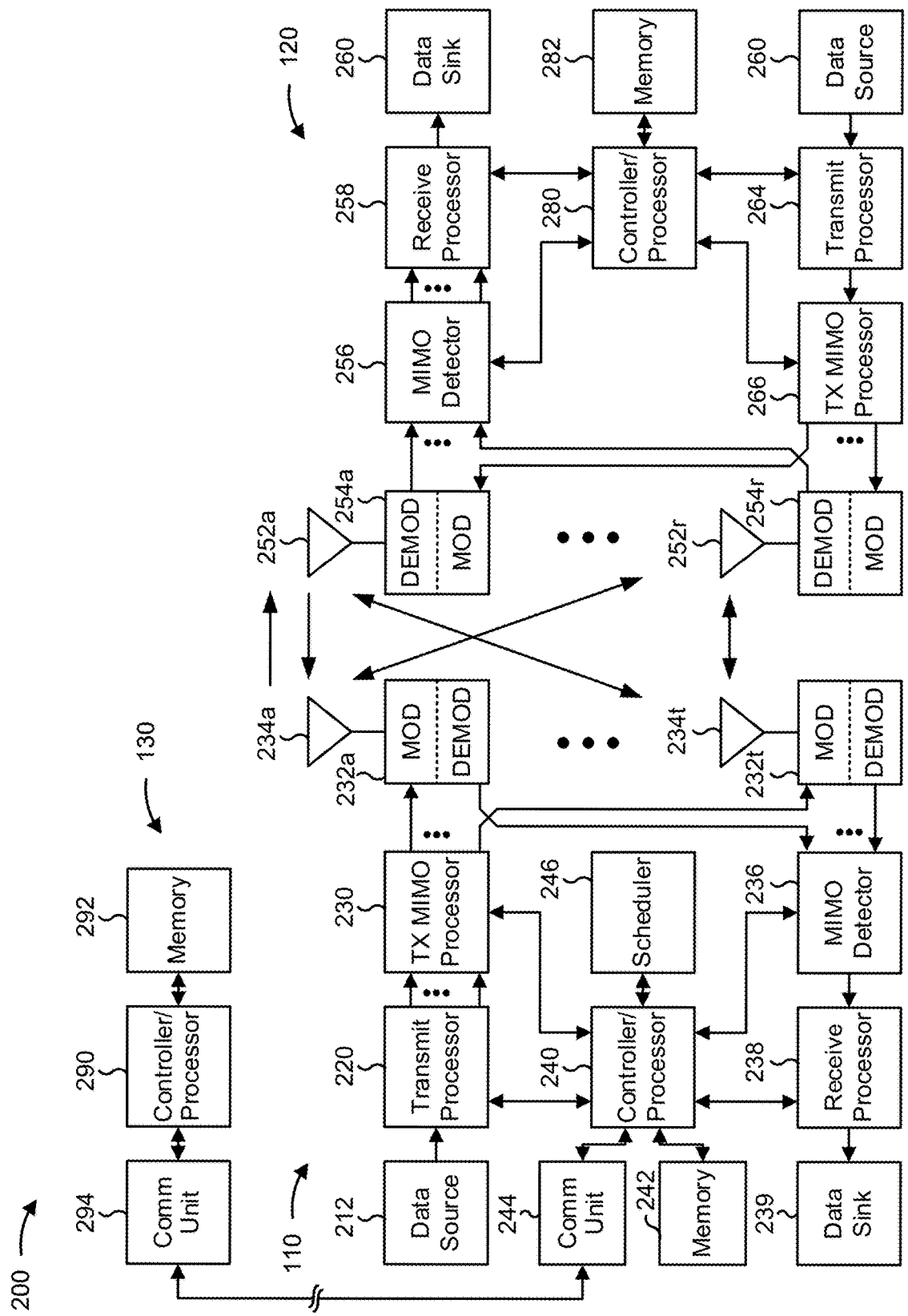
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with fast secondary cell recovery for URLLC, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, a UE (e.g., UE 120) may include means for providing, to a first cell, a beam failure indication associated with a beam of a secondary cell, wherein the beam failure indication is provided via a dedicated PUCCH resource; means for providing, based at least in part on providing the beam failure indication, a beam index report to a second cell, wherein the beam index report is to cause recovery of the secondary cell to be triggered, and wherein the beam index report includes information that identifies a preferred beam associated with the recovery of the secondary cell; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
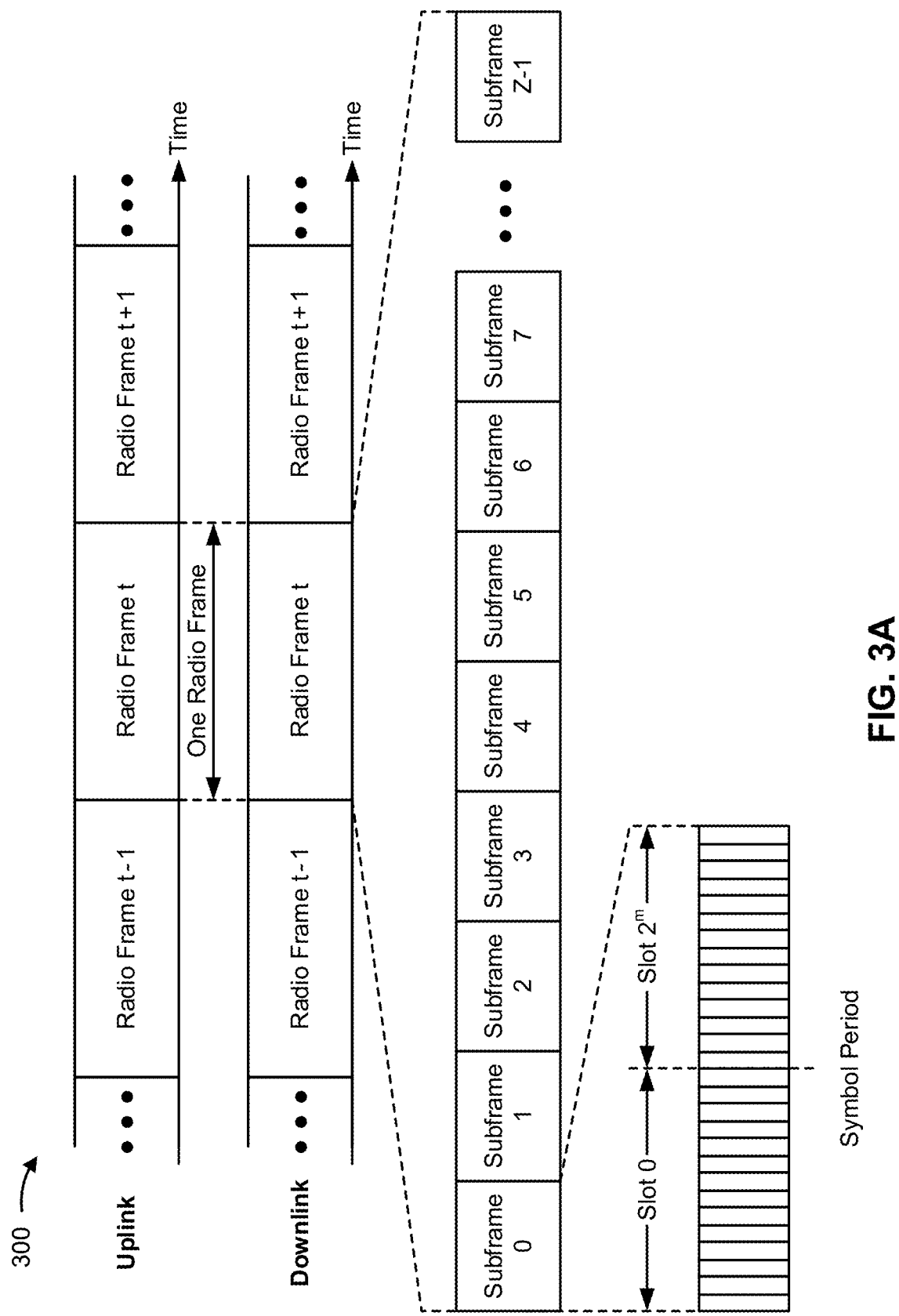
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
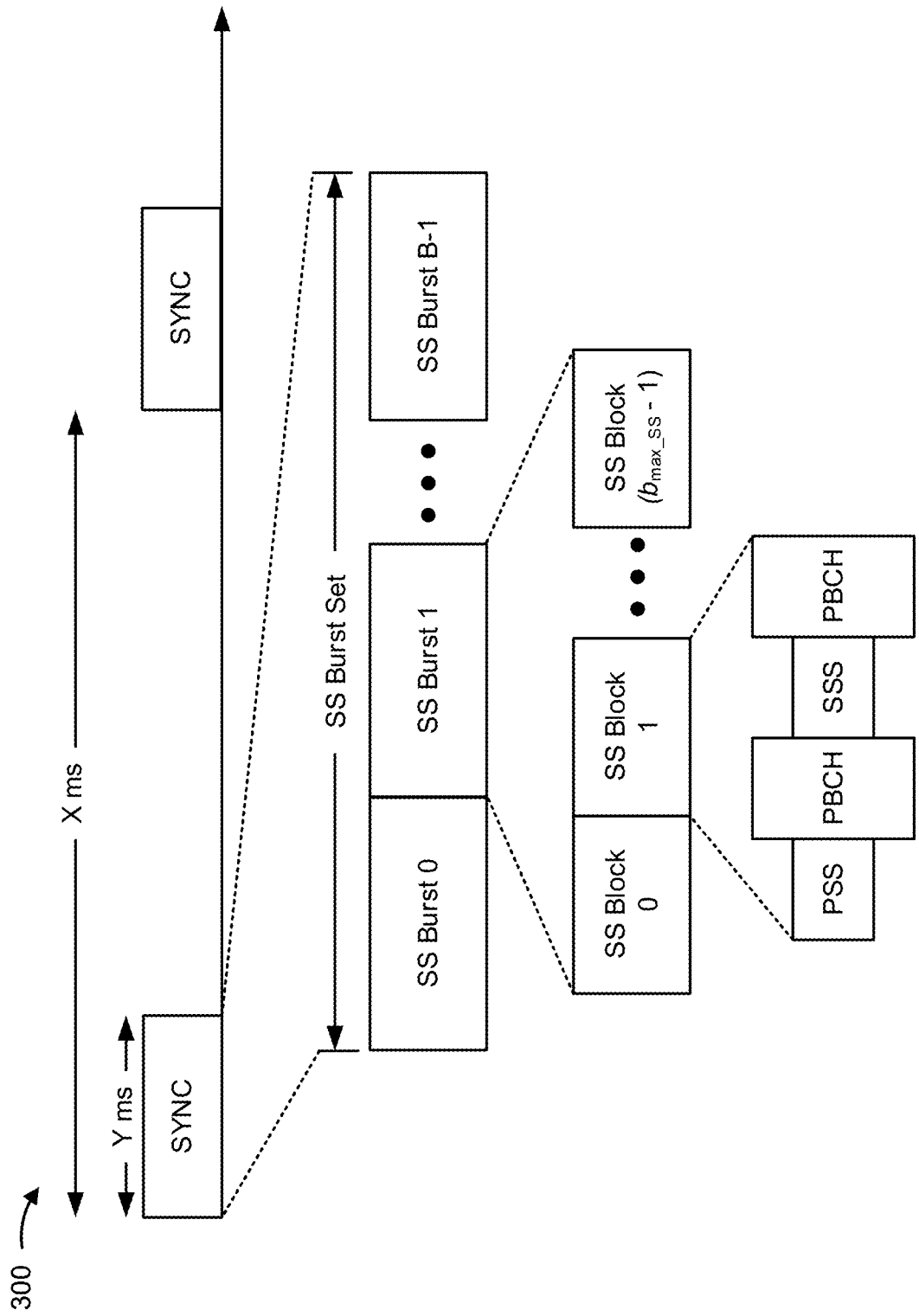
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
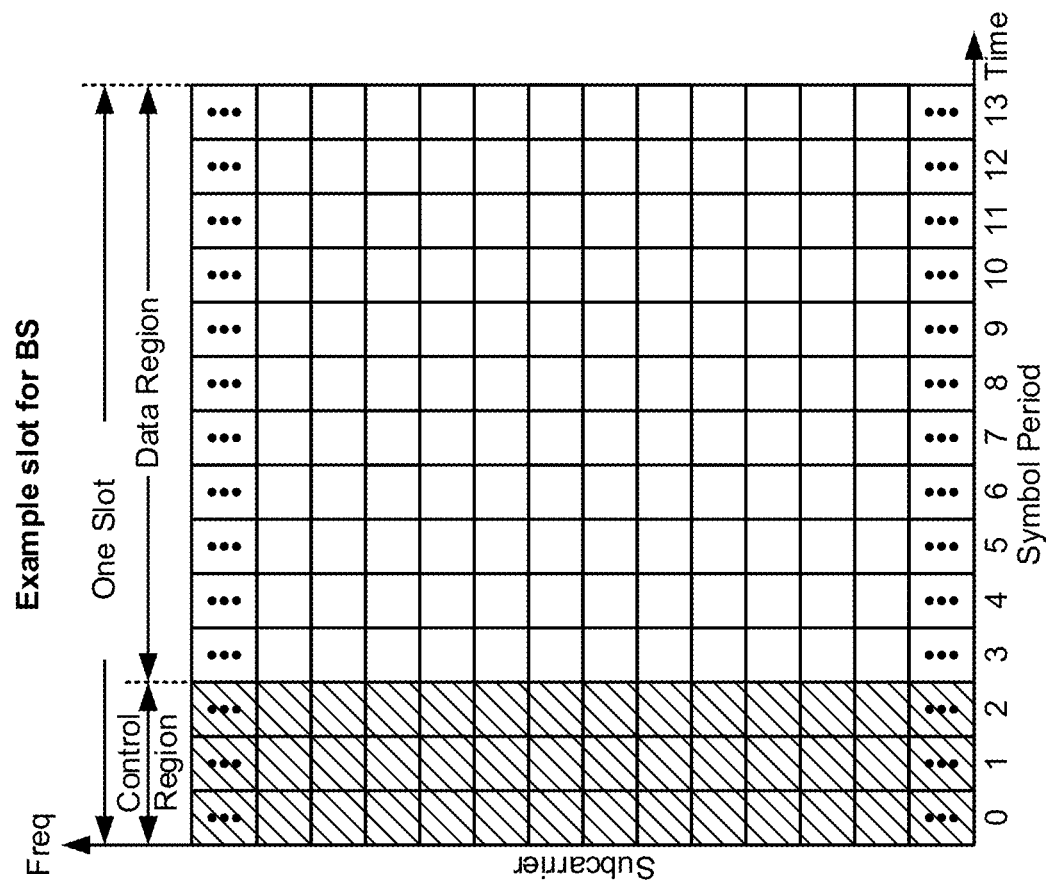
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
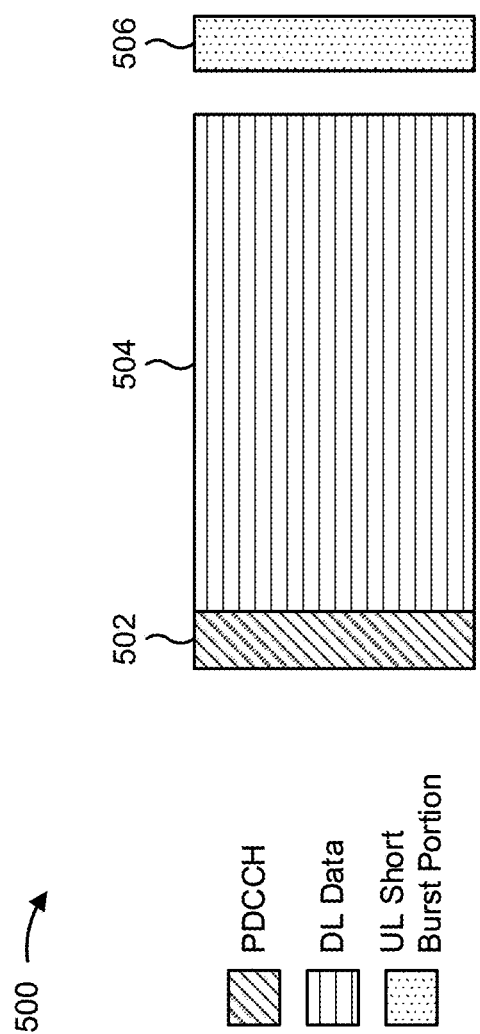
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples may differ from what is described with regard to FIG. 5.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples may differ from what is described with regard to FIG. 6.

Upon detecting a beam failure of a beam associated with a secondary cell, beam recovery should be performed as quickly as possible (e.g., such that the UE can continue to receive and/or transmit communications via the secondary cell). Fast recovery of the secondary cell is particularly useful when the secondary cell is used for traffic with strict latency and/or reliability requirements, such as ultra-reliable low-latency (URLLC) traffic. In a case where a first cell (e.g., a primary cell) remains operational despite the beam failure associated with the secondary cell (e.g., when a beam associated with the first cell and the beam associated with the secondary cell are at different frequencies), recovery of the secondary cell can be enabled via the first cell.

Some aspects described herein provide techniques and apparatuses for fast recovery of a secondary cell. In some aspects, the fast recovery may be used when the secondary cell is used for traffic with strict latency and/or reliability requirements (e.g., URLLC traffic). In some aspects, the fast recovery of the secondary cell improves operation of a user equipment by reducing a latency of communications that when recovering from a beam failure of a beam associated with a secondary cell. In some aspects, the fast recovery of the secondary cell conserves power of the user equipment that may otherwise be wasted when communications fail due to the beam failure of the beam associated with the secondary cell.

FIGS. 7A-7E are diagrams illustrating examples of fast secondary cell recovery for URLLC, in accordance with various aspects of the present disclosure. In FIGS. 7A-7E, a beam of a secondary cell (e.g., associated with a base station (BS) 110) is to be used for transmissions of URLLC traffic between a UE (e.g., UE 120) and the secondary cell.

Figure 7A:
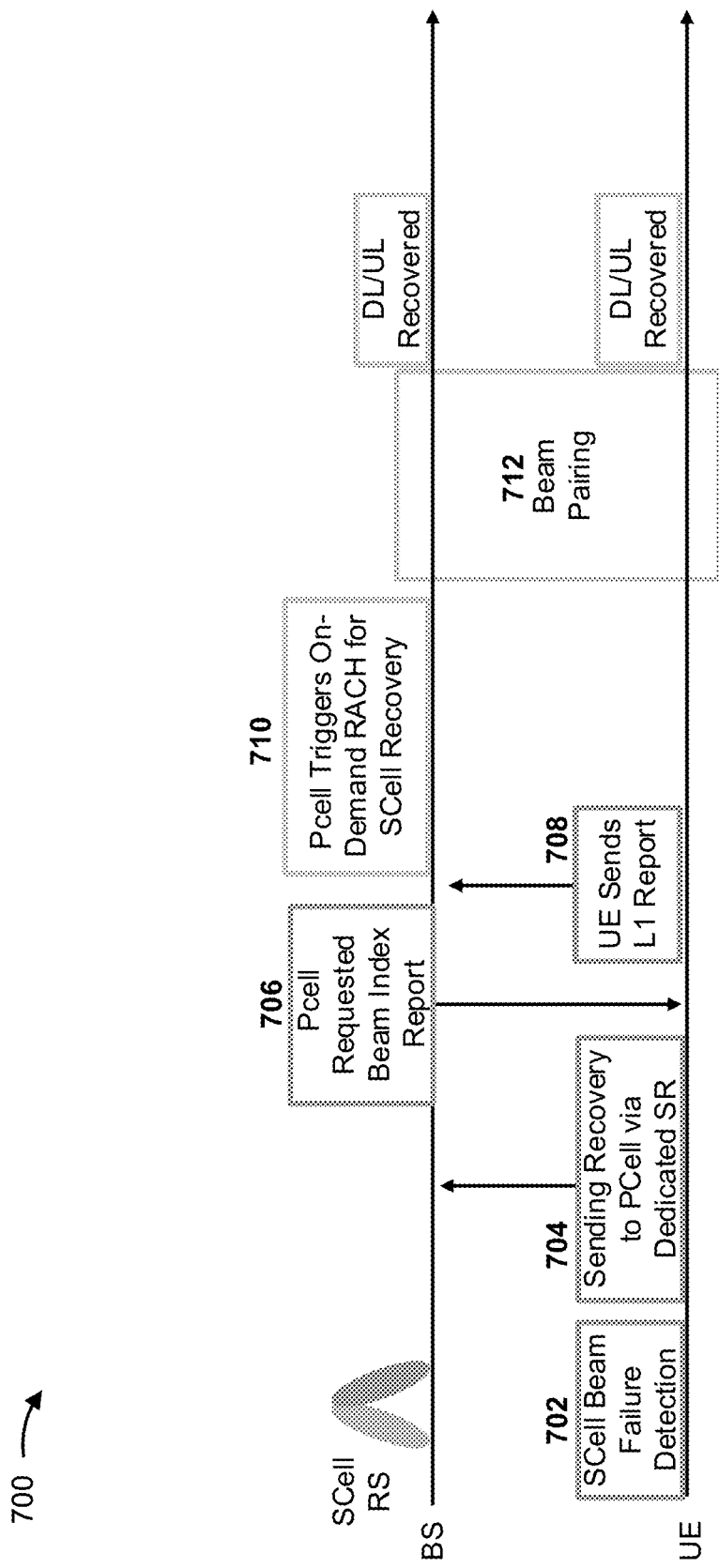
FIGS. 7A-7E are diagrams illustrating examples of fast secondary cell recovery for URLLC, in accordance with various aspects of the present disclosure.

FIG. 7A is a diagram of an example 700 of fast secondary cell recovery for URLLC. As shown in FIG. 7A, and by reference number 702, a UE (e.g., UE 120) may detect a beam failure associated with the secondary cell. For example, the UE may detect, based at least in part on a reference signal associated with the secondary cell (SCell RS), a beam failure associated with a beam of the secondary cell. In some aspects, the UE may detect the beam failure when one or more measurements of the reference signal, associated with the secondary cell, satisfy a threshold. In some aspects, the threshold may be expressed in terms of an INSYC or OUT OF SYNC BLER, targeted to match a hypothetical PDCCH performance transmitted with the beam. As another example, the UE may detect the beam failure when a particular number of signal strength measurements of the reference signal (e.g., one or more measurements, a value that is a function of two or more measurements, and/or the like) are less than a threshold signal strength (e.g., during a particular time window).

As shown by reference number 704, the UE may provide, to a first cell (e.g., a primary cell associated with base station 110) a beam failure indication associated with the beam of the secondary cell. In some aspects, the beam failure indication acts as an indication that recovery of the secondary cell is needed.

In some aspects, the UE may provide the beam failure indication in a dedicated physical uplink control channel (PUCCH) resource (sometimes referred to as a dedicated scheduling request (SR)). In some aspects, the dedicated PUCCH uplink resource may be a low-overhead resource, such as a single bit in the PUCCH that is reserved for providing a beam failure indication. In some aspects, information that identifies the dedicated PUCCH resource may be configured on the UE (e.g., based at least in part on signaling provided by the base station).

In some aspects, the UE may provide a SCell index associated with the secondary cell. For example, the UE may report the SCell index, associated with the secondary cell, in a medium access control (MAC) control element. In some aspects, the UE may provide the SCell index after the UE provides the beam failure indication in the dedicated PUCCH resource (e.g., in a separate communication).

In some aspects, as shown by reference number 706, the UE may receive a beam index report request from a second cell after the UE provides the beam failure indication. For example, the first cell may receive the beam failure indication, and the second cell may send, to the UE, a request for a beam index report (e.g., via a PDCCH). In some aspects, the first and second cells may be the same cell. In some aspects, the first and second cells may be different cells. For example, in some aspect the first cell may be a primary cell, and the second cell may be a cell in a same cell group as the primary cell. In some aspects, the second cell may be a cell that supports uplink transmissions. In some aspects, the secondary cell may be used for downlink transmissions only.

In some aspects, the beam index report request may be carried in a normal uplink grant scrambled with cell radio network temporary identifier (C-RNTI) or a modulation and coding scheme cell radio network temporary identifier (MCS-C-RNTI).

As shown by reference number 708, the UE may provide a beam index report (sometimes referred to as a layer 1 (L1) report) based at least in part on the beam index report request received from the second cell. For example, the UE may receive the beam index report request, generate a beam index report, and provide the beam index report to the second cell.

In some aspects, the beam index report may include information that identifies a preferred beam associated with the recovery of the secondary cell. For example, the beam index report may include information (e.g., an 8 bit sequence) that identifies a beam index corresponding to a preferred beam (e.g., a beam that the UE has selected as a suitable beam for recovery of the secondary cell based at least in part on detecting one or more SSBs associated with the beam). In some aspects, the beam index report may be carried in a medium access control control element (MAC-CE) dedicated to secondary cell beam failure recovery.

In some aspects, confirmation of reception of the beam index report may be a normal uplink grant scheduling a transmission for a same hybrid automatic repeat request (HARD) process as a physical uplink shared channel (PUSCH) carrying the beam index report.

In some aspects, the UE may provide the beam index report in order to cause recovery of the secondary cell to be triggered (e.g., based at least in part on the beam index report), as described in further detail below.

In some aspects, based at least in part on the beam index report provided by the UE, recovery of the secondary cell may be triggered. In some aspects, as shown by reference number 710, the recovery of the secondary cell may be performed based at least in part on a dynamic (i.e., on-demand) random access channel (RACH) procedure associated with beam pairing between the secondary cell and the UE. For example, the second cell may activate a RACH procedure on the secondary cell for the beam index associated with the preferred beam (e.g., as identified in the beam index report). In some other aspects, a sounding reference signal (SRS) transmission from the UE can be triggered by the base station in order to enable beam pairing. In some examples, the SRS can be triggered to be quasi co-located (QCL) with the reported beam in the beam index report associated with the secondary cell.

As shown by reference number 712, the UE and the secondary cell may then engage in beam pairing based at least in part on the RACH procedure being activated on the secondary cell. For example, the UE may transmit, using a first transmit beam, an initial RACH message (e.g., MSG1). Here, if the UE receives a responsive RACH message (e.g., MSG2), then the RACH procedure may proceed until beam pairing is complete and the secondary cell is recovered, as indicated in FIG. 7A.

Alternatively, if the initial RACH message fails (e.g., if the UE does not receive MSG2 within a threshold amount of time), then the UE may retransmit, using a second transmit beam (e.g., a differently configured transmit beam, such as a beam with a comparatively higher power) the initial RACH message and await a responsive RACH message. This process may be repeated until the UE receives a responsive RACH message (after which beam pairing can be completed and the secondary cell is recovered). In some aspects, the RACH-based approach is advantageous in order to enable fast secondary cell recovery without beam correspondence between the downlink and uplink beams (e.g., since the UE can adjust and/or reconfigure the transmit beam each time the UE retransmits the initial RACH message).

Figure 7B:
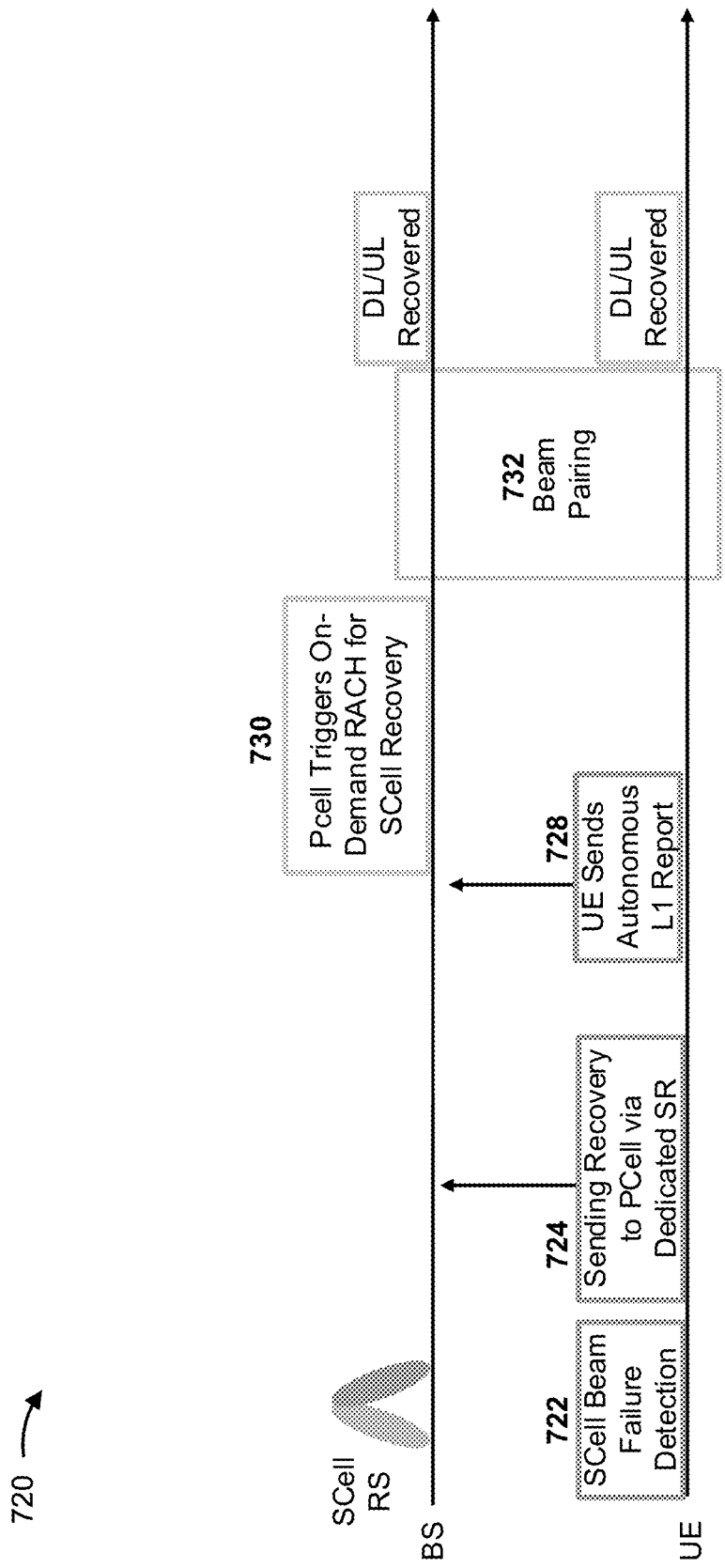

FIG. 7B is a diagram of an example 720 of fast secondary cell recovery for URLLC. As shown by reference number 722, a UE (e.g., UE 120) may detect a beam failure associated with the secondary cell. In some aspects, the UE may detect the beam failure in a manner similar to that described above in association with reference number 702 of FIG. 7A.

As shown by reference number 724, the UE may provide, to a first cell (e.g., a primary cell associated with base station (BS) 110) a beam failure indication associated with the beam of the secondary cell. In some aspects, the UE may provide the beam failure indication in a manner similar to that described above in association with reference number 704 of FIG. 7A.

As shown by reference number 728, the UE may automatically provide the beam report index to the first cell, in some aspects. For example, the UE may be configured with a reporting delay that identifies an amount of time (e.g., a number of slots) after providing the beam failure indication that the UE is to wait before automatically providing the beam index report. Here, the UE may, after an amount of time equal to the reporting delay has lapsed, automatically (e.g., without a request from the second cell) provide the beam index report to the second cell. In some aspects, the reporting delay may be configured on the UE (e.g., based at least in part on signaling provided by the first cell or the second cell). In some aspects, the reporting delay provides scheduling flexibility at the base station (e.g., such that the base station has time to schedule uplink transmissions around resources in which the second cell is to receive the beam index report). In some aspects, providing the beam index report based at least in part on the reporting delay reduces latency associated with recovery of the secondary cell, which may be useful when the secondary cell is used for URLLC traffic.

In some aspects, based at least in part on the beam index report automatically provided by the UE, recovery of the secondary cell may be triggered. In some aspects, as shown by reference number 730, the recovery of the secondary cell may be performed based at least in part on a dynamic RACH procedure associated with beam pairing between the secondary cell and the UE. For example, the second cell may activate a RACH procedure on the secondary cell for the beam index associated with the preferred beam (e.g., as identified in the beam index report). The dynamic RACH procedure may be similar to that described above in association with reference number 710 of FIG. 7A.

As shown by reference number 732, the UE and the secondary cell may then engage in beam pairing based at least in part on the RACH procedure being activated on the secondary cell. The beam pairing may be conducted in a similar manner to that described above in association with reference number 712 of FIG. 7A.

Figure 7C:
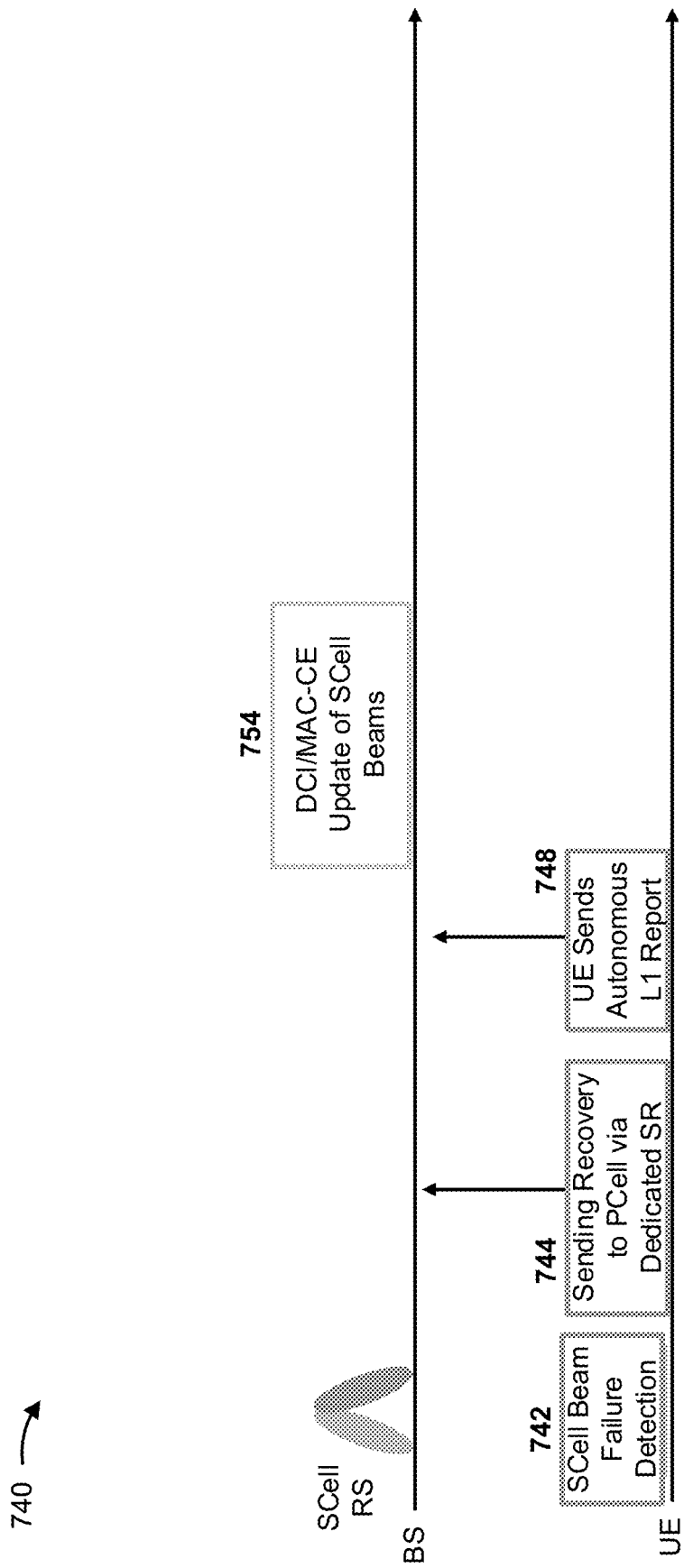

FIG. 7C is a diagram of an example 740 of fast secondary cell recovery for URLLC. As shown by reference number 742, a UE (e.g., UE 120) may detect a beam failure associated with the secondary cell. In some aspects, the UE may detect the beam failure in a manner similar to that described above in association with reference number 702 of FIG. 7A.

As shown by reference number 744, the UE may provide, to a first cell (e.g., a primary cell associated with base station (BS) 110) a beam failure indication associated with the beam of the secondary cell. In some aspects, the UE may provide the beam failure indication in a manner similar to that described above in association with reference number 704 of FIG. 7A.

As shown by reference number 748, the UE may automatically provide the beam report index to the first cell, in some aspects. In some aspects, the UE may automatically provide the beam failure indication in a manner similar to that described above in association with reference number 728 of FIG. 7A.

In some aspects, based at least in part on the beam index report automatically provided by the UE, recovery of the secondary cell may be triggered. In some aspects, as shown by reference number 754, the recovery of the secondary cell may be performed based at least in part on a downlink control information (DCI) or media access control (MAC) control element beam update associated with the secondary cell. For example, upon receiving the beam index report, the second cell may update a DCI/MAC control element (MAC-CE), associated with the secondary cell, such that the UE can begin receiving communications from the secondary cell using the preferred beam, as identified by the beam index report.

Figure 7D:
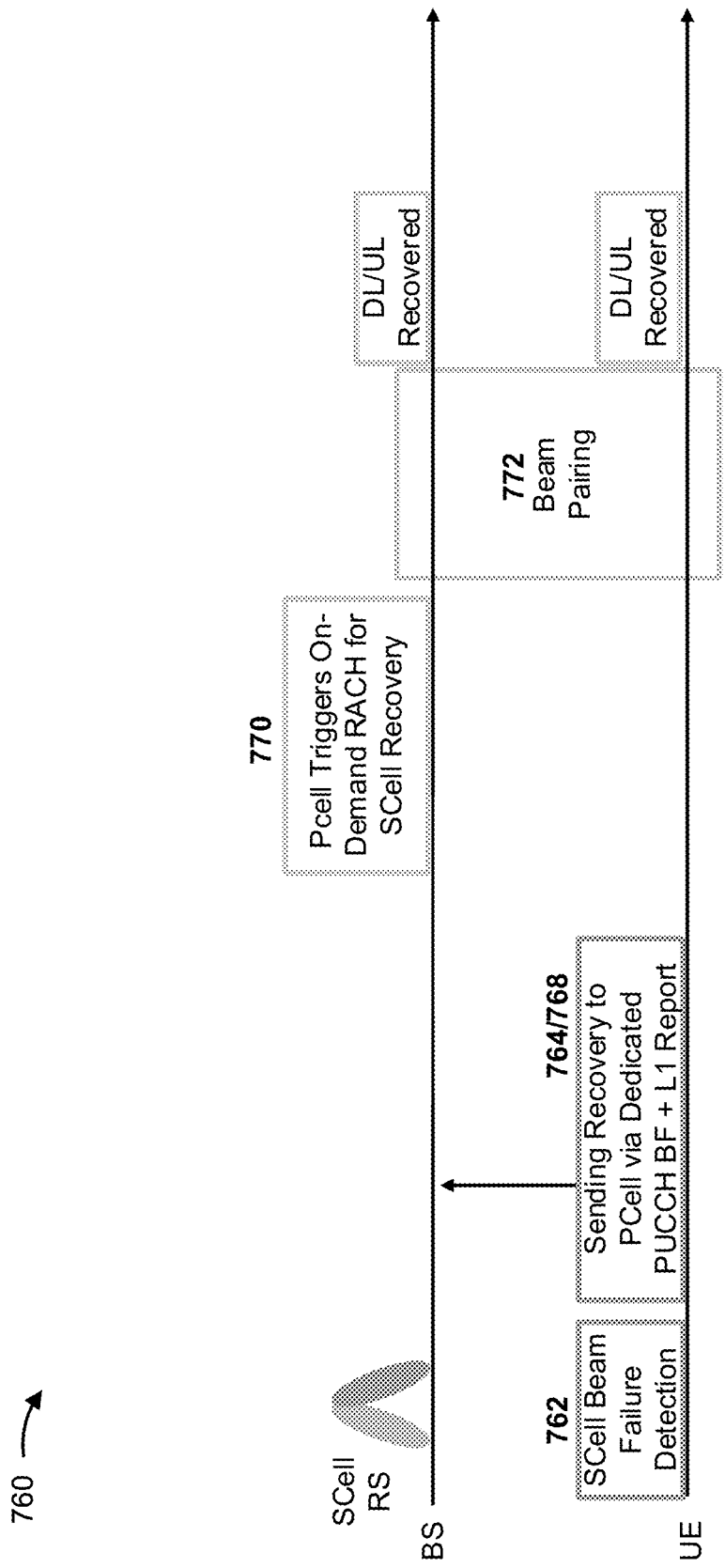

FIG. 7D is a diagram of an example 760 of fast secondary cell recovery for URLLC. As shown by reference number 762, a UE (e.g., UE 120) may detect a beam failure associated with the secondary cell. In some aspects, the UE may detect the beam failure in a manner similar to that described above in association with reference number 702 of FIG. 7A.

As shown by reference number 764/768, the UE may provide, to a first cell (e.g., a primary cell associated with base station (BS) 110) a beam failure indication associated with the beam of the secondary cell, along with a beam index report. In other words, in some aspects, the UE may be configured to provide the beam failure indication and the beam index report in a single communication. In some aspects, the single communication that includes the beam failure indication and the beam index report may include information similar to that described above in association with reference numbers 704 and 708, respectively, of FIG. 7A. In some aspects, providing the beam failure indication and the beam index report in the same communication reduces latency associated with recovery of the secondary cell, which may be useful when the secondary cell is used for URLLC traffic.

In some aspects, based at least in part on the beam index report being provided by the UE along with the beam failure indication, recovery of the secondary cell may be triggered. In some aspects, as shown by reference number 770, the recovery of the secondary cell may be performed based at least in part on a dynamic RACH procedure associated with beam pairing between the secondary cell and the UE. For example, the second cell may activate a RACH procedure on the secondary cell for the beam index associated with the preferred beam (e.g., as identified in the beam index report). The dynamic RACH procedure may be similar to that described above in association with reference number 710 of FIG. 7A.

As shown by reference number 772, the UE and the secondary cell may then engage in beam pairing based at least in part on the RACH procedure being activated on the secondary cell. The beam pairing may be conducted in a similar manner to that described above in association with reference number 712 of FIG. 7A.

Figure 7E:
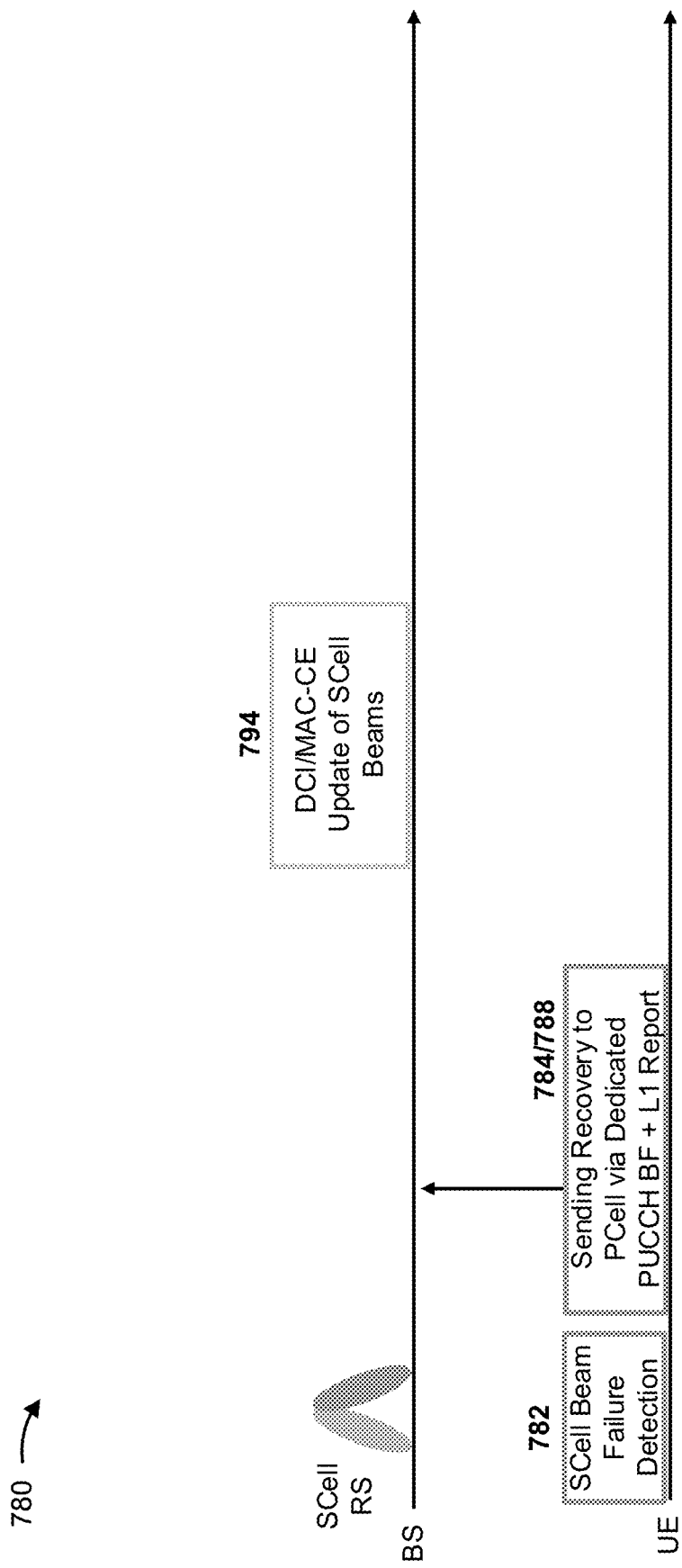

FIG. 7E is a diagram of an example 780 of fast secondary cell recovery for URLLC. As shown by reference number 782, a UE (e.g., UE 120) may detect a beam failure associated with the secondary cell. In some aspects, the UE may detect the beam failure in a manner similar to that described above in association with reference number 702 of FIG. 7A.

As shown by reference number 784/788, the UE may provide, to a first cell (e.g., a primary cell associated with base station (BS) 110) a beam failure indication associated with the beam of the secondary cell in a single communication to the first cell (e.g., in a manner similar to the described above in association with reference number 764/768 of FIG. 7D).

In some aspects, based at least in part on the beam index report provided by the UE along with the beam failure indication, recovery of the secondary cell may be triggered. In some aspects, as shown by reference number 794, the recovery of the secondary cell may be performed based at least in part on a DCI or MAC control element beam update associated with the secondary cell (e.g., in a manner similar to the described above in association with reference number 754 of FIG. 7C).

In some aspects, a manner in which information associated with a beam failure (e.g., a beam failure indication, a beam index report, and/or the like) is provided by the UE may be determined based at least in part on the beam being associated with URLLC traffic. For example, the UE may be configured such that information associated with a beam failure of a beam used for URLLC traffic is to be provided in a particular manner described above (e.g., automatically, based at least in part on a reporting delay, and/or the like). In this way, beam failure reporting can be triggered differently for beams associated with URLLC traffic (e.g., as compared to beams used for regular traffic, beams used for non-URLLC traffic, and/or the like). In some aspects, an association of a given beam with URLLC traffic may be indicated via a URLLC control resource set, beam monitoring via a particular radio network temporary identifier (RNTI), via a URLLC search space identifier, via a radio resource control (RRC)/MAC control element/DCI configuration of certain beams as URLLC, and/or the like.

As indicated above, FIGS. 7A-7E are provided as examples. Other examples may differ from what is described with respect to FIGS. 7A-7E.

Figure 8:
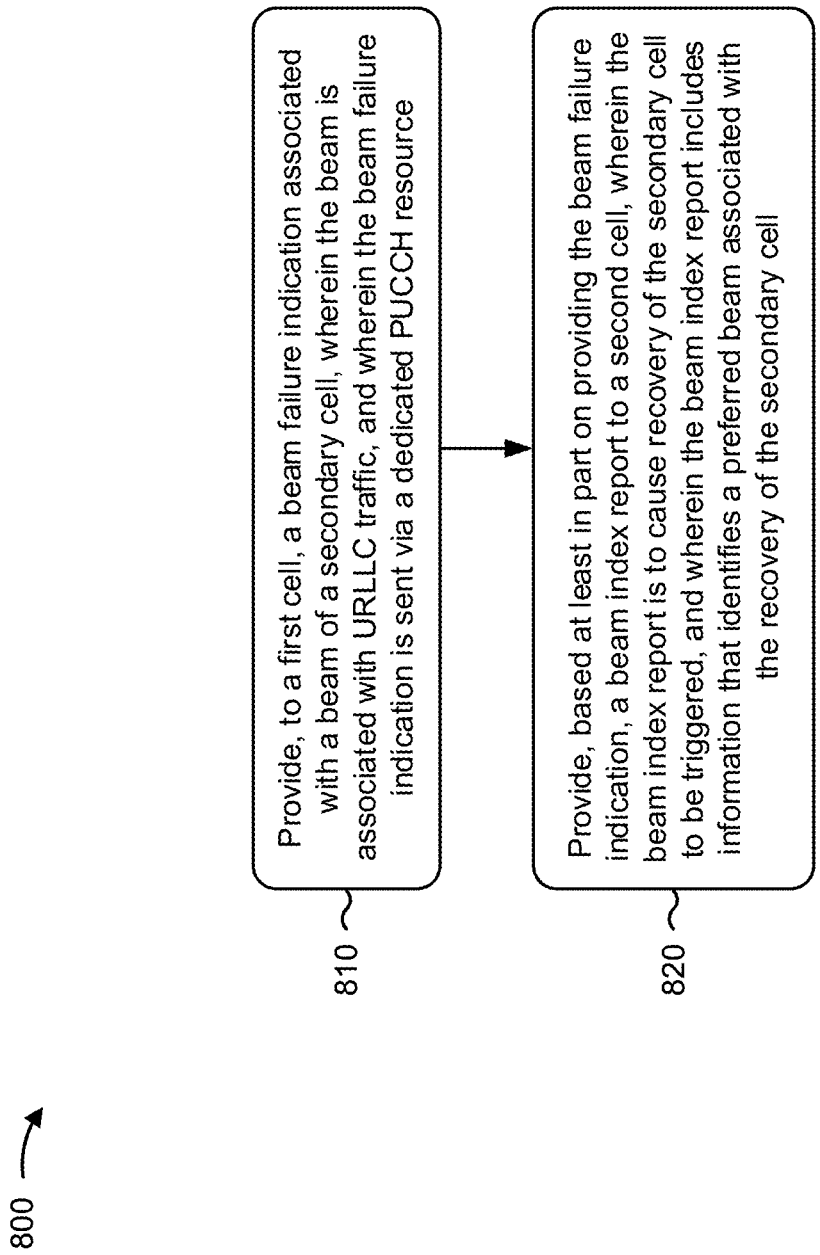
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a wireless communication device (e.g., base station 110, UE 120) performs fast secondary cell recovery for URLLC.

As shown in FIG. 8, in some aspects, process 800 may include providing, to a first cell, a beam failure indication associated with a beam of a secondary cell, wherein the beam failure indication is provided via a dedicated PUCCH resource (block 810). For example, the UE (e.g., using antenna 252, TX MIMO processor 266, transmit processor 264, controller/processor 250, and/or the like) may provide, to a first cell (e.g., a primary cell associated with base station 110), a beam failure indication associated with a beam of a secondary cell (e.g., associated with base station 110) wherein the beam failure indication is provided via a dedicated PUCCH resource, as described above. In some aspects, the beam may be associated with URLLC traffic.

As shown in FIG. 8, in some aspects, process 800 may include providing, based at least in part on providing the beam failure indication, a beam index report to a second cell, wherein the beam index report is to cause recovery of the secondary cell to be triggered, and wherein the beam index report includes information that identifies a preferred beam associated with the recovery of the secondary cell (block 820). For example, the UE (e.g., using antenna 252, TX MIMO processor 266, transmit processor 264, controller/processor 250, and/or the like) may provide, based at least in part on providing the beam failure indication, a beam index report to a second cell (e.g., the primary cell associated with base station 110, another cell associated with base station 110, and/or the like), wherein the beam index report is to cause recovery of the secondary cell to be triggered, and wherein the beam index report includes information that identifies a preferred beam associated with the recovery of the secondary cell, as described above.

Process 800 may include additional aspects, such as any single aspect or any combination of aspects described below and/or in connection with one or more other processes described elsewhere herein.

In a first aspect, the beam is associated with ultra-reliable low-latency traffic.

In a second aspect, alone or in combination with the first aspect, the first cell and the second cell are a same cell.

In a third aspect, alone or in combination with one or more of the first and second aspects, the first cell is a primary cell, the primary cell is in a same cell group as the secondary cell.

In a fourth aspect, alone or in combination with one or more of the first through third aspects, the secondary cell is used for downlink transmissions only.

In a fifth aspect, alone or in combination with one or more of the first through fourth aspects, the second cell is a cell that supports uplink transmissions.

In a sixth aspect, alone or in combination with one or more of the first through fifth aspects, the beam index report is provided based at least in part on a beam index report request that is received from the second cell, wherein the beam index report request is received after the beam failure indication is provided.

In a seventh aspect, alone or in combination with one or more of the first through sixth aspects, the beam index report request is a normal uplink grant scrambled with cell radio network temporary identifier (C-RNTI) or a modulation and coding scheme cell radio network temporary identifier (MCS-C-RNTI).

In an eighth aspect, alone or in combination with one or more of the first through seventh aspects, the beam index report is carried in a medium access control control element (MAC-CE) dedicated to secondary cell beam failure recovery.

In a ninth aspect, alone or in combination with one or more of the first through eighth aspects, confirmation of reception of the beam index report is a normal uplink grant scheduling a transmission for a same hybrid automatic repeat request (HARD) process as a physical uplink shared channel (PUSCH) carrying the beam index report.

In a tenth aspect, alone or in combination with one or more of the first through ninth aspects, the beam index report is automatically provided based at least in part on a reporting delay, wherein the reporting delay identifies an amount of time after providing the beam failure indication, that the UE is to wait before automatically providing the beam index report.

In an eleventh aspect, alone or in combination with one or more of the first through tenth aspects, the beam index report is provided in a same communication as the beam failure indication.

In a twelfth aspect, alone or in combination with one or more of the first through eleventh aspects, the recovery of the secondary cell is based at least in part on a dynamic random access channel (RACH) procedure associated with beam pairing between the secondary cell and the UE.

In a thirteenth aspect, alone or in combination with one or more of the first through twelfth aspects, the recovery of the secondary cell is based at least in part on a downlink control information (DCI) beam update associated with the secondary cell.

In a fourteenth aspect, alone or in combination with one or more of the first through thirteenth aspects, the recovery of the secondary cell is based at least in part on a media access control (MAC) control element beam update associated with the secondary cell.

In a fifteenth aspect, alone or in combination with one or more of the first through fourteenth aspects, a manner in which the beam failure indication is provided is determined based at least in part on the beam being associated with ultra-reliable low-latency traffic.

In a sixteenth aspect, alone or in combination with one or more of the first through fifteenth aspects, process 800 includes providing a secondary cell index associated with the secondary cell in the beam index report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   providing, to a first cell, a beam failure indication, associated with a beam of a secondary cell,
      wherein the beam failure indication is provided as a single bit in a physical uplink control channel; and
   providing, based at least in part on providing the beam failure indication, a beam index report to a second cell or the first cell,
      wherein the beam index report is to cause a recovery of the secondary cell to be triggered,
      wherein the beam index report includes first information that identifies a beam index corresponding to a preferred beam associated with the recovery of the secondary cell, and
      wherein the beam index report is carried in a medium access control-control element (MAC-CE) dedicated to the recovery, or
      wherein the beam index report includes second information that identifies a secondary cell index associated with the secondary cell.

2. The method of claim 1, wherein the beam is associated with ultra-reliable low-latency traffic.

3. The method of claim 1, wherein the first cell and the second cell are a same cell.

4. The method of claim 1, wherein the first cell is a primary cell, wherein the primary cell is in a same cell group as the secondary cell.

5. The method of claim 1, wherein the second cell is a cell that supports uplink transmissions.

6. The method of claim 1, wherein the beam index report is provided based at least in part on a beam index report request that is received from the second cell,
wherein the beam index report request is received after the beam failure indication is provided.

7. The method of claim 1, wherein the beam index report is carried in the MAC-CE.

8. The method of claim 1, wherein the beam index report is automatically provided based at least in part on a reporting delay,
wherein the reporting delay identifies an amount of time, after providing the beam failure indication, that the UE is to wait before automatically providing the beam index report.

9. The method of claim 1, wherein the beam index report is provided in a same communication as the beam failure indication.

10. The method of claim 1, wherein the recovery of the secondary cell is based at least in part on at least one of:
a dynamic random access channel (RACH) procedure associated with beam pairing between the secondary cell and the UE, or
a downlink control information (DCI) beam update associated with the secondary cell.

11. The method of claim 1, wherein the beam index report includes the second information.

12. The method of claim 11, further comprising:
providing the second information.

13. A user equipment (UE) for wireless communication, comprising:
a memory; and
one or more processors coupled to the memory, the one or more processors configured to:
provide, to a first cell, a beam failure indication associated with a beam of a secondary cell,
wherein the beam failure indication is provided as a single bit in a physical uplink control channel; and
provide, based at least in part on providing the beam failure indication, a beam index report to a second cell or the first cell,
wherein the beam index report is to cause a recovery of the secondary cell to be triggered,
wherein the beam index report includes first information that identifies a beam index corresponding to a preferred beam associated with the recovery of the secondary cell; and
wherein the beam index report is carried in a medium access control-control element (MAC-CE) dedicated to the recovery, or
wherein the beam index report includes second information that identifies a secondary cell index associated with the secondary cell.

14. The UE of claim 13, wherein the beam is associated with ultra-reliable low-latency traffic.

15. The UE of claim 13, wherein the beam index report is provided based at least in part on a beam index report request that is received from the second cell,
wherein the beam index report request is received after the beam failure indication is provided.

16. The UE of claim 13, wherein the beam index report is automatically provided based at least in part on a reporting delay,
wherein the reporting delay identifies an amount of time, after providing the beam failure indication, that the UE is to wait before automatically providing the beam index report.

17. The UE of claim 13, wherein the beam index report is provided in a same communication as the beam failure indication.

18. The UE of claim 13, wherein the recovery of the secondary cell is based at least in part on at least one of:
a dynamic random access channel (RACH) procedure associated with beam pairing between the secondary cell and the UE, or
a downlink control information (DCI) beam update associated with the secondary cell.

19. The UE of claim 13, wherein the beam index report is carried in the MAC-CE.

20. The UE of claim 13, wherein the beam index report includes the second information.

21. The UE of claim 20, wherein the one or more processors are further configured to:
provide the second information.

22. A non-transitory computer-readable medium storing one or more instructions for wireless communication, the one or more instructions comprising:
one or more instructions that, when executed by one or more processors of a user equipment (UE), cause the one or more processors to:
provide, to a first cell, a beam failure indication associated with a beam of a secondary cell,
wherein the beam failure indication is provided as a single bit in a physical uplink control channel; and
provide, based at least in part on providing the beam failure indication, a beam index report to a second cell or the first cell,
wherein the beam index report is to cause a recovery of the secondary cell to be triggered, or
wherein the beam index report includes first information that identifies a beam index corresponding to a preferred beam associated with the recovery of the secondary cell; and
wherein the beam index report is carried in a medium access control-control element (MAC-CE) dedicated to the recovery, or
wherein the beam index report includes second information that identifies a secondary cell index associated with the secondary cell.

23. The non-transitory computer-readable medium of claim 22, wherein the beam is associated with ultra-reliable low-latency traffic.

24. The non-transitory computer-readable medium of claim 22, wherein the beam index report is carried in the MAC-CE.

25. The non-transitory computer-readable medium of claim 22, wherein the beam index report includes the second information.

26. The non-transitory computer-readable medium of claim 25, wherein the one or more instructions, when executed by the one or more, further cause the one or more processors to:
provide the second information.

27. An apparatus for wireless communication, comprising:
means for providing, to a first cell, a beam failure indication associated with a beam of a secondary cell,
wherein the beam failure indication is provided as a single bit in a physical uplink control channel; and
means for providing, based at least in part on providing the beam failure indication, a beam index report to a second cell or the first cell,
wherein the beam index report is to cause recovery of the secondary cell to be triggered, wherein the beam index report includes first information that identifies a beam index corresponding to a preferred beam associated with the recovery of the secondary cell; and wherein the beam index report is carried in a medium access control-control element (MAC-CE) dedicated to the recovery, or wherein the beam index report includes second information that identifies a secondary cell index associated with the secondary cell.

28. The apparatus of claim 27, wherein the beam index report is carried in the MAC-CE.

29. The apparatus of claim 27, wherein the beam index report includes the second information.

30. The apparatus of claim 29, further comprising: means for providing the second information.

* * * * *